No. 671,614. Patented Apr. 9, 1901.
R. SHIRLEY.
GATE VALVE.
(Application filed Sept. 26, 1900.)
(No Model.)
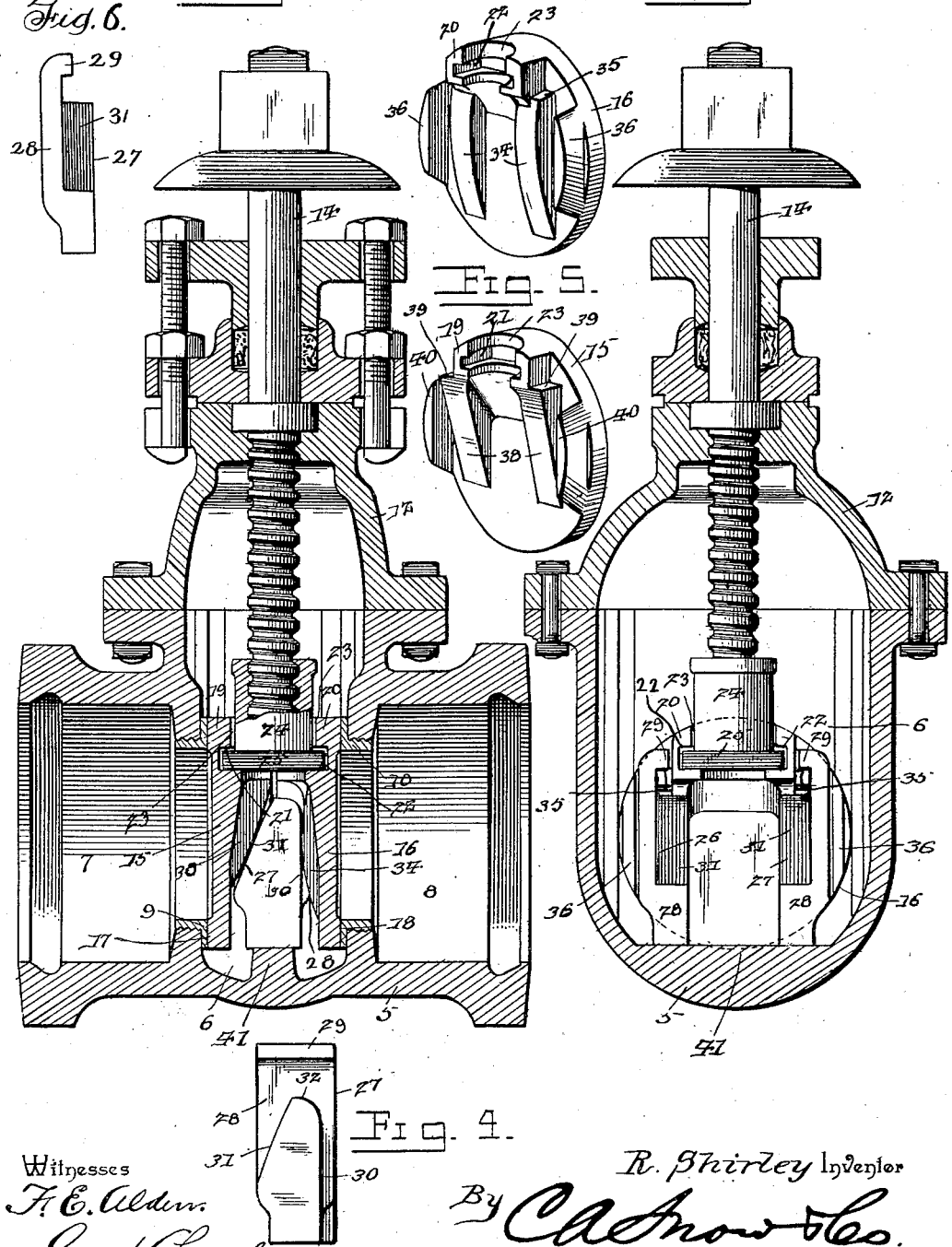

UNITED STATES PATENT OFFICE.

ROBERT SHIRLEY, OF COHOES, NEW YORK.

GATE-VALVE.

SPECIFICATION forming part of Letters Patent No. 671,614, dated April 9, 1901.

Application filed September 26, 1900. Serial No. 31,182. (No model.)

*To all whom it may concern:*

Be it known that I, ROBERT SHIRLEY, a citizen of the United States, residing at Cohoes, in the county of Albany and State of New York, have invented a new and useful Gate-Valve, of which the following is a specification.

This invention relates to gate-valves in general, and more particularly to the gates thereof, one object of the invention being to provide a construction wherein the gate will be expanded into its seats when moved to close the valve and will be contracted when moved to open the valve, leakage through the valve being thus prevented when the valve is closed, while sticking of the valve in the seats when the gate is raised will be overcome.

A further object of the invention is to provide a construction wherein the applied force in seating the members of the gate will be on the lines of the centers of the members, so as to seat them firmly and evenly.

Additional objects and advantages of the invention will be evident from the following description.

In the drawings forming a portion of this specification, and in which like numerals of reference indicate similar parts in the several views, Figure 1 is a sectional view taken longitudinally through the valve and showing the gate in its closed position. Fig. 2 is a section taken through the casing of the valve at right angles to the section of Fig. 1, the gate being shown with one closing member removed and the remaining parts in elevation. Fig. 3 is a perspective view showing the inner side of one closing member of the valve. Fig. 4 is an elevation showing one of the wedge-plates and the wedge formed thereon. Fig. 5 is a perspective view showing the inner side of the second closing member. Fig. 6 is a view of one of the plates with a wedge thereon and looking at right angles to Fig. 4.

Referring now to the drawings, the present gate-valve comprises a casing 5 of usual construction and comprising the central valve-chamber 6 and the end chambers 7 and 8 and between which chambers are arranged the valve-seats 9 and 10, adapted for engagement by the gate for closing off the flow through the casing. The casing of the valve also includes the usual dome 12, in which is formed an extension of the valve-chamber 6 to receive the valve or gate when raised from its closed position, and above this extension of the chamber 6 there is engaged a screw-shaft 14, having a bearing in the casing and through the medium of which the gate is raised and lowered.

The gate comprises two members 15 and 16 of disk shape, the outer faces of which have the usual annular flanges 17 and 18 for direct engagement with the valve-seats. At the upper portions of the inner faces of the disks 15 and 16 are formed blocks 19 and 20, having grooves 21 and 22 therein, formed in the faces of recesses 23 in the inner faces of the blocks, these recesses being semicircular in form or slightly less, so that when disposed mutually opposite and slightly spaced they will form arcs of a common circle. A nut 24 is disposed with its side portions in these recesses and has an angular flange 25 at its base, which engages slidably with the grooves 21 and 22, whereby while the nut may be raised and lowered to correspondingly move the disks it will not prevent movement of the disks toward and away from each other. The screw-shaft 14 engages this nut, whereby when said shaft is moved in one direction the disks will be raised from contact with their seats, while when the shaft is rotated in an opposite direction the disks will be lowered into position between the seats.

In order to force the disks 15 and 16 against their seats when they are moved downwardly and to release them and permit them to move rearwardly from the seats when the gate is raised, wedges are employed, which when the gate is lowered are forced between the disks to spread or separate them and when the gate is raised may drop and permit the disks to move toward each other. The wedges in question are shown at 26 and 27, and each of these wedges is formed upon the face of a plate 28, the lower end of which is reduced in width and upon the upper portion of which is formed a flange 29 on the same face of the plate with the wedge. The wedge has one side 30 in the plane of one side of the narrowed portion of the plate 28, while the opposite side 31 of the wedge begins at the base of the broader portion of the plate and extending beyond the side 30 terminates substantially midway of the sides of the plate, the sides 30 and 31 being connected by an arc-shaped end portion 32. The side 30 of the wedge is straight, while the side 31 has a slight curvature, as shown.

Upon the inner face of the disk 16 are formed two arc-shaped cams or rockers 34, the upper ends of which overlap the base of the block 20 and the outer side portions thereof extending slightly above the lower end of the block to form shoulders 35. The cams or rockers are disposed parallel mutually and with the direction of movement of the gate, and spaced outwardly from the rockers are flanges 36, for a purpose that will be presently described.

The disk 15 has parallel wedge-shaped cams 38 formed upon its inner face and in such position as to lie opposite to the cams upon the disk 16, the active faces of the cams 38 being slightly curved. The sides of the cams 38 extend slightly beyond the sides of the block 19 to form shoulders 39, which aline with the shoulders at the upper ends of cams 34, while spaced outwardly from the cams 38 are flanges 40, disposed to lie opposite to the flanges 36. Thus when the two disks are brought together to engage the flange 25 of the nut 24 with the grooves 21 and 22 there will be formed two guideways, one at each side of the cams of the disk and between said cams and the adjacent flanges. In these guideways are disposed the plates 28, with the faces 31 of the wedges against the cams 38 and with the faces 30 against the rockers or cams 34, the flanges 29 of the plates 28 resting upon the shoulders formed by the upper ends of the cams 34 and 38, and with the lower narrowed ends of the plates 28 depending below the lower sides of the disks. Thus, if the plates 28 be moved upwardly, the wedges will be forced against the cams 34 and 38, separating them and forcing the disks 15 and 16 apart to increase the width of the gate and engage them with their seats. To thus move the plates 28 upwardly to effect the wedging action, a stop 41 is formed at the bottom of the chamber 6 and is so positioned that when the gate descends the lower ends of the plates 28 will strike upon the stop, and continued movement of the gate in a downward direction will cause the wedges to be forced between the cams of the disks, so that the disks will be forced into intimate contact with their seats. Conversely, when the gate is raised the pressure upon the wedges is removed and they drop from their operative positions and permit the disks 15 and 16 to move toward each other and away from their seats, when the gate may be raised with a minimum of friction.

It will be noted upon reference to Fig. 1 that one face of plate 28 stands vertical and engages the cam 34, whose center is so disposed that said vertical face is tangent to this curved cam at a point from which a radius may be drawn parallel to the common axis of the disks 15 and 16. If this contacting face of the plate 28 were converged to the opposite face, it would engage the cam 34 below this point and pressure would not be applied centrally of the disk. The opposite face of the plate 28 is of necessity slanted in order to get the wedging action, and to compensate for this slant the center of curvature of cam 38 is above the axis of disk 15. With this construction, therefore, the points of contact of the cams of each disk are in a line which intersects the axis of the disk, and the pressure is evenly distributed and the disks are firmly seated. As the gate is raised the screw-shaft 14 of course takes a position between the disks.

It will of course be understood that in practice various modifications of the specific construction shown may be made and that any suitable materials and proportions may be used for the various parts without departing from the spirit of the invention.

What is claimed is—

1. In a gate-valve, a gate comprising spaced closing members having cams upon their adjacent faces, and wedges disposed in contact with the cams and adapted for movement therebetween to separate the members, the contacting portions of the wedges and cams being in lines intersecting the common axis of the members, whereby the energy applied to the members will be distributed thereover.

2. In a gate-valve, a gate comprising spaced closing members having cams upon their adjacent faces, and wedges disposed in contact with the cams for movement therebetween to separate the members, the contacting faces of the wedges and cams being formed to contact on lines intersecting the axis of the closing members.

3. In a gate-valve, the combination with spaced closing members having cams on their inner faces, the contacting faces of which cams are arc-shaped with the centers of the cams of one member in a line intersecting the axis of said member, and the centers of the cams of the other member in a line displaced from the axis of that member, of wedges in contact with the cams, the faces of the wedges in contact with the first cams being straight and at right angles to the axis of the corresponding closing member, and the opposite faces being inclined, whereby the points of contact with the cams of each closing member are in a line intersecting the axis of that closing member.

4. In a gate-valve, the combination with a casing comprising a valve-chamber having seats at opposite ends thereof, of a gate comprising spaced closing members disposed in said chamber for engagement with the seats, said members having cams on their inner faces which are curved, wedges disposed against said cams for movement therebetween to force the closing members into contact with the seats, the contacting faces of the wedges being in contact on single lines intersecting the common axis of the closing members, a stop in the chamber for engagement by the wedges to operate them in one direction, and means for raising and lowering the gate.

5. A gate-valve comprising spaced closing members each having a recessed block having a groove in the wall of its recess, a nut disposed in the recess and having a flange engaged with the grooves, cams upon the inner faces of the members and having shoulders at their upper ends, flanges spaced from the cams, plates slidably disposed between the cams and flanges and having flanges for engagement with the shoulders to limit movement of the plate in one direction, wedges carried by the plates for contact with the cams to force the members apart, a stop for engagement by the plate to operate the wedges, and means for raising and lowering the members.

6. A gate-valve comprising spaced closing members each having a recessed block having a groove in the wall of its recess, a nut disposed in the recess and having a flange engaged with the grooves, cams upon the inner faces of the members and having shoulders at their upper ends, flanges spaced from the cams, plates slidably disposed between the cams and flanges and having flanges for engagement with the shoulders to limit movement of the plate in one direction, wedges carried by the plates for contact with the cams to force the members apart, and means for operating the wedges.

In testimony that I claim the foregoing as my own I have hereto affixed my signature in the presence of two witnesses.

ROBERT SHIRLEY.

Witnesses:
WILLIAM DUNCAN,
WILLIAM BAILLIE.